Dec. 29, 1970
E. J. ROBERTS
3,551,100
REDUCTION OF SULPHATES
Filed Sept. 11, 1967
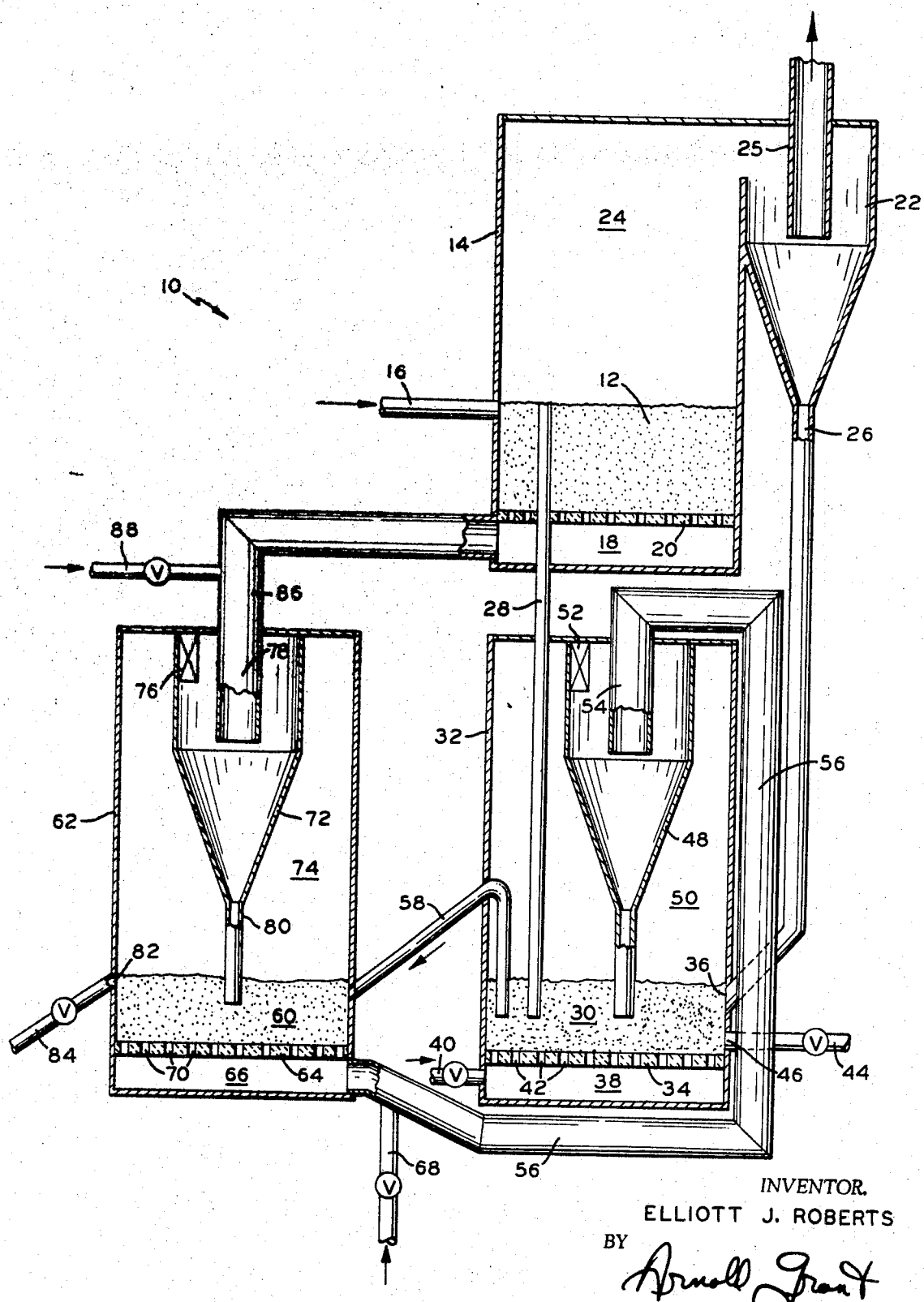
INVENTOR.
ELLIOTT J. ROBERTS
BY
Arnold Grant
ATTORNEY.

United States Patent Office 3,551,100
Patented Dec. 29, 1970

3,551,100
REDUCTION OF SULPHATES
Elliott J. Roberts, Westport, Conn., assignor to Dorr-Oliver Incorporated, Stamford, Conn., a corporation of Delaware
Filed Sept. 11, 1967, Ser. No. 666,798
Int. Cl. C01b 17/20
U.S. Cl. 23—137                                4 Claims

ABSTRACT OF THE DISCLOSURE

A process for reducing certain metal salt in a system of at least two fluidized bed reactors. The feed metal salt and a hydrocarbon are introduced to the primary reduction bed and the hydrocarbon is partially oxidized to generate reducing gases. The reducing gases partially reduce the feed metal salt and then the remaining reducing gases and the partially reduced metal salt are concurrently transferred to the next fluidized bed for further reduction.

---

Fluidized bed treatment and the application of fluidized bed techniques to the processing of metallic ores has met with considerable success and commercial acceptance since its inception over eighty years ago. However, in one particular field of application, i.e., reducing reactions wherein solids are contacted with reducing gases such as hydrogen, carbon monoxide, or mixtures thereof, the economics and the technology have been less than satisfactory. Until recently it has been essential to generate the reducing gases in a separate step in a producer such as the "Galusha Gas Generator." This auxiliary equipment not only increased the capital costs required for a fluidized bed reducing system but also had a telling effect on the operating costs. A mixture of air and steam is used to generate the gases, thus diluting the carbon monoxide and hydrogen with a large amount of nitrogen, which, in turn, necessitates the use of larger fluid bed reactors. Furthermore the gases emanating from the generator had to first be cleaned and cooled in a series of precipitators and scrubbers before they could be introduced into the fluidized bed reactor. This entails a serious energy loss as well as requiring additional capital and operating costs.

With the advent of direct fuel injection, i.e., direct injection of a hydrocarbon fuel into the fluidized bed and oxidation therein to generate the necessary heat and the hydrogen and carbon monoxide reducing gases, the economics of the fluidized bed reducing system were, to an extent, enhanced. The system was now commercially attractive in operating situations in which the reducing reaction requirements were not unusual or stringent. In systems such as the magnetic reduction of iron ores, where a complete, 100 percent, reduction to magnetite is not required, where the amount of reducing gas per pound of product is relatively small, where the feed material is relatively porous and where the excess reducing agent required for the reaction is minimal, fluidized bed reduction with "direct fuel injection" proves to be an excellent reducing system.

However, in situations where the operating parameters are not as lax, the aforementioned problems of economics and technology militates against selection of a fluidized bed system. For example, in the reduction of certain metal sulfates, particularly the alkali and alkaline earths, and the reduction of lateritic ore to extract the nickel content, a comparison beween fluidized bed treatment and other reducing systems based on efficiency, reduction rates and cost per ton of fully reduced product has heretofore dictated against the former.

The inapplicability of fluidized bed technology to the alkali and alkaline earth sulfates is due basically to the relatively solid, non-porous nature of the feed material. It is difficult for the reducing gases to fully penetrate the individual feed particles, and thus, to complete the reduction process in a single reactor in a reasonable time period. In a system such as the magnetic reduction of iron ore the incomplete reduction, or "short-circuiting," of the feed ore is relatively inconsequential because as litle as one percent by volume of magnetite in a particle will permit magnetic selection of that particle. Reduction of these sulfates, on the other hand, requires a near total reduction of the ore with the integrity of the reduced product bordering on 100 percent. Short circuiting, however, is not the only problem involved in this system; if it were the system could be "streamlined"; i.e., the feed ore could be passed through a series of individual reactors with the ore being incrementally reduced in each succeeding reactor. Streamlining of a process to attain a complete reaction between the individual components in a reasonable time period is well known in the chemical industry and is widely used in conjunction with fluidized bed treatment.

When, however, it was attempted to streamline the alkali and alkaline earth sulfate reducing process and to incorporate therewith the economics of "direct fuel injection" the system broke down, producing an inferior product that was, to an uneconomically large extent, only partially reduced. Subsequent investigations revealed that the prior art method of combining "direct fuel injection" with a streamlined process, i.e., the feed ore moving in one direction from a first reactor to a second reactor, being first partially reduced in the first reactor and fully reduced in the second reactor while the reducing gas is being generated in, and then transferred from, the second reactor to the first reactor, resulted in a reoxidation of the sulfide to the sulfate. It was found that the oxygen bearing gas used in the fluidization of the bed and the combustion of the hydrocarbon would reoxidize the already reduced sulfide, thus contaminating the final product.

The problems were the same with the reduction of lateritic ore to nickel, i.e., auxiliary gas generators made the system economically unattractive, the feed ore was relatively non-porous and thus slow reacting requiring streamlining of the process in at least two reactors, and combination of streamlining and "direct fuel injection," as taught by the prior art, resulted in a reoxidation of a substantial part of the previously reduced elemental nickel.

The problem, then, was how to streamline a process incorporating "direct fuel injection" without the inherent disadvantage of the incoming combustion and fluidizing gas reoxidizing previously reduced feed ore. Applicant solved this problem by injecting the hydrocarbon fuel and the oxygen bearing combustion gas in the first, or primary reduction reactor; generating the reducing gases in the primary reduction reactor in sufficient quantities to fully reduce all the feed material; and, transferring the partially reduced ore and the unused reducing gas to the second, or finishing, reactor to complete the reduction process. By this departure from the teaching of the prior art, no oxygen containing gas is allowed to come in contact with the finishing reactor bed particles. The fact that the reducing gases produced in the primary reduction reactor are partially utilized presents no disability since sufficient reducing gases are generated to have a substantial excess remaining at the end of the reduction. Thus, the integrity of the reduced product is maintained in a streamlined process incorporating "direct fuel injection."

It is therefore an object of the present invention to incorporate "direct fuel injection" into a streamlined fluidized bed reducing system without reoxidizing the previously reduced product.

It is another object of the present invention to inject a hydrocarbon fuel and combustion gas into a fluidized bed reducing system prior to transfer of the partially reduced feed or to the finishing reactor of the system.

It is still another object of the present invention to generate reducing gases in the fluidized bed of the first of at least two fluidized bed reactors comprising a fluidized bed reducing system.

The subject matter which applicant regards as his invention is particularly pointed out and distinctly claimed in the concluding portion of the specification. The invention, however as to its organization and method of operation together with further objects and advantages thereof will best be understood by reference to the following description taken in conjunction with the accompanying drawing which is a diagrammatic representation of a fluidized bed reducing system incorporating the present invention.

Referring now to the drawing, the fluidized bed reducing system 10, incorporating applicant's invention, will be described in detail with calcium sulfate ($CaSO_4$) as the feed ore. It should be understood, however, that the designation of calcium sulfate is by way of example only and should not be construed as limiting, applicant's reducing system being equally as applicable to many other feed materials. The proceeding specification will also be described, again by way of example only, for a three fluidized bed reactor reduction system; it being understood that applicant's inventive concept is equally as applicable to a streamlined process having at least two fluidized bed reactors.

Calcium sulfate, preferably in the form of a filter cake, is fed into the fluidized bed 12 of a preheat reactor 14 through a conduit 16. Hot waste gases, generated in a manner to be described in detail below, are introduced into the windbox portion 18 of the reactor 14 and rise through the constriction plate 20 to heat and fluidize the bed 12. A hot cyclone 22, positioned immediately adjacent the reactor 14, receives the spent fluidizing gases from the freeboard portion 24 of the reactor and strips any elutriated particles from the gases; discharging the gases through overflow 25 and the stripped particles through apex conduit 26.

An elongated, longitudinally extending transfer pipe 28 opens at one end thereof into fluidized bed 12 to receive the preheated feed particles and at the other end thereof discharges the particles by gravity into the fluidized bed 30 of primary reactor 32. Apex conduit 26 discharges the stripped particles from the preheat reactor 14 into fluidized bed 30 through inlet 36.

Fluidizing gas, which may be air, commercial grade oxygen, or mixtures thereof, is pumped into the windbox portion 38 of reactor 32 through valved conduit 40 and rises through the orifices 42 in constriction plate 34 to support and fluidize the bed 30. A hydrocarbon fuel, which may be either coal, oil or natural gas, is introduced into the fluidized bed 30 through valved conduit 44 and inlet 46. The fuel is partially combusted by the fluidizing gas, generating the reducing gases hydrogen and carbon monoxide and sufficient heat to sustain the bed at operating temperature. The ratio of oxygen in the fluidizing gas to the hydrocarbon fuel is maintained well below the stoichiometric amount for complete combustion, thus maximizing production of carbon monoxide and hydrogen. Sufficient extra fuel and oxygen supplying gas are introduced to provide an excess of carbon monoxide and hydrogen over and above the stoichiometric amount required for complete reduction so as to provide proper impetus for the reaction and enough carbon dioxide and water vapor to provide heat to maintain the heat balance. Fuel and oxygen bearing gas flows can be adjusted to give the best ratio of reductant to product gases $$(CO+H_2/CO_2+H_2O);$$

the ratio depending on the material being treated, the temperature and particle size, etc.

The reducing gases, carbon monoxide and hydrogen, react with and partially reduce, the calcium sulfate forming calcium sulfide, carbon dioxide and water vapor. A hot cyclone 48, positioned in the freeboard 50 of reactor 32 to prevent heat loss, receives the partially spent fluidizing and reducing gases through inlet 52 and strips any elutriated particles from the gases. The cyclone discharges the hot, cleansed gases through overflow 54 into conduit 56, and returns the stripped elutriated particles back to the fluidized bed 30.

An elongated transfer pipe 58 descends at one end thereof into the fluidized bed 30, to receive the partially reduced feed particles, and opens at the other end thereof into fluidized bed 60 of finishing reactor 62. Calcium sulfate is a relatively non-porous solid material and as a result it is difficult for the reducing gases to fully reduce the sulfate to the sulfide in a single reactor within an economically reasonable time. Thus, in order to provide the maximum amount of reduction with a minimum of fuel, it is expedient to streamline the process, i.e., carryout the reduction in at least two successive fluidized beds. The pressure drop in primary reactor 32 generated by cyclone 48 cooperates with the pressure differential developed by constriction plate 64 in reactor 62 to transfer the partially reduced particles from primary fluidized bed 30 to finishing fluidized bed 60.

The inert product gases, carbon dioxide and water vapor, along with the remaining unused reducing gases are transferred through conduit 56 to windbox 66 of reactor 62. A valved, oxygen bearing gas inlet conduit 68 is positioned along conduit 56, adjacent the windbox 66, to supply sufficient oxygen to burn enough of the remaining reducing gases so as to maintain the proper heat balance in the system. The hot gases rise from windbox 66 through orifices 70 in constriction plate 64 to fluidize and complete the reduction of the calcium sulfate to calcium sulfide. A hot cyclone 72, positioned in the freeboard 74 to prevent heat loss, receives the spent fluidizing gases through inlet 76; discharging the gases through overflow 78 and returning any elutriated particles back to the bed 60 through underflow conduit 80. The finished, fully reduced, calcium sulfide product is discharged from the reactor through discharge 82 and valved conduit 84.

The spent fluidizing gases from cyclone 72 are received in conduit 86 and any remaining carbon monoxide and/or hydrogen is combusted by an oxygen bearing gas being introduced through valved inlet 88. The full fuel value of the hydrocarbon is therefore completely utilized before it is introduced to windbox 18 of preheat reactor 14.

Thus, by way of review, it can be seen that the hydrocarbon fuel is introduced into and partially combusted in, the primary reactor 32 to begin the reduction of the feed ore. The product gases, from the primary reactor and the remaining, unused, reducing gases then move concurrently along with the partially reduced feed material to the finishing reactor. In this manner, there is no excess oxygen present to reoxidize the fully reduced product, as is the case in the prior art countercurrent method where the oxygen bearing gas is introduced directly into the finishing reactor. Thus, the integrity of the finally reduced finished product can be maintained in a streamlined process incorporating "direct fuel injection."

The following example is merely intended to further illustrate the invention and should not be considered to be limiting, as many equivalent procedures will be obvious to one skilled in the art from a study thereof.

EXAMPLE 194 kilos of deslimed gypsum ($CaSO_4 \cdot 2H_2O$) together with 34 kilos of water adhering thereto were introduced over a period of one hour into a 3 foot diameter preheat fluidized bed compartment. The bed was maintained at 650° C. by the hot fluidizing gases and both the free and combined water were evaporated and driven off. The calcined and preheated $CaSO_4$ was then collected by a cyclone and transferred into the fluidized bed of the primary reduction compartment. This bed was fluidized with air and 40.5 kilos of Bunker C oil was injected into the bed to supply the reducing gases, hydrogen and carbon monoxide. Partial combustion of the oil and the reduction of the $CaSO_4$ to $CaS$ by the gases liberated enough heat to maintain the bed at 850° C. Approximately 80% reduction of the $CaSO_4$ was realized in this fluidized bed. The partially reduced feed and the exit gases, which contained a considerable excess of carbon monoxide and hydrogen, were then introduced to the third fluidized bed compartment for the complete reduction of the $CaSO_4$ to $CaS$. The final product of bed number three, which amounted to 92 kilos of 96% $CaS$, was discharged to a quench tank for cooling prior to further processing. Hot exit gases from this bed were then mixed with air to combust the residual carbon monoxide and hydrogen and introduced to compartment number one to fluidize and preheat the incoming gypsum.

As this invention may be embodied in several forms without departing from the spirit or essential character thereof, the present embodiment is illustrative and not restrictive. The scope of the invention is defined by the appended claims rather than by the description preceding them and all embodiments which fall within the meaning and equivalency of the claims are, therefore, intended to be embraced by those claims.

I claim:
1. A process of reducing metal salts consisting of sulphates of the alkali and alkaline earth groups in a multi-zone fluidized bed reaction system which comprises establishing a first and second treatment zone with each zone containing a bed of said metal salts, introducing into said first treatment zone a feed material of said metal salts and a hydrocarbon fuel, fluidizing said metal salts in said first zone by passing a fluidizing gas therethrough, said gas containing oxygen in amounts insufficient for the stoichiometric combustion of said fuel, partially combusting said fuel in said first zone to generate reducing gases and sufficient heat to maintain said first zone at reduction temperatures, at least partially reducing said metal salts to the metal sulfides with the thus produced reducing gases, transferring said at least partially reduced metal salts to said second treatment zone, separately and concurrently transferring to said second zone the spent gases from said first zone, said spent gases containing unused reducing gases, fluidizing the bed of solids maintained in said second zone with said spent gases and further reducing the metal sulfates in said second zone to the metal sulfides with the reducing gases in said spent gases.

2. The process of claim 1 wherein the feed material is at least 90% fully reduced in said second zone.

3. The process of claim 1 further comprising preheating said feed material in a preheat treatment zone prior to its introduction into said first zone, at least a portion of the hot gases utilized in said preheat zone being at least a portion of the spent fluidizing gases from said second zone.

4. The process of claim 1, further comprising mixing an oxygen containing gas with said spent gases to combust a portion of the unused reducing gases.

References Cited

UNITED STATES PATENTS

| | | | |
|---|---|---|---|
| 1,492,810 | 5/1924 | Rossberg et al. | 23—137 |
| 1,584,597 | 5/1926 | Bassett | 23—137 |
| 3,460,912 | 8/1969 | Squires | 23—224 |
| 2,481,217 | 9/1949 | Hemminger | 75—26 |
| 2,711,368 | 6/1955 | Lewis | 75—26 |
| 2,742,353 | 4/1956 | Ogorzaly | 75—26 |
| 3,303,017 | 2/1967 | Mayer et al. | 75—26 |
| 3,364,011 | 1/1968 | Porter et al. | 75—26 |

DONALD L. WALTON, Primary Examiner

U.S. Cl. X.R.

75—26